United States Patent
Iwai et al.

(10) Patent No.: US 9,693,199 B2
(45) Date of Patent: Jun. 27, 2017

(54) LOCATION INFORMATION MANAGEMENT SYSTEM, MOBILE STATION, SERVICE MANAGEMENT SERVER, MOVEMENT SENSING METHOD, AND NON-TRANSITORY COMPUTER READABLE MEDIUM

(71) Applicant: NEC Corporation, Tokyo (JP)

(72) Inventors: Takanori Iwai, Tokyo (JP); Ko Ito, Tokyo (JP); Shunsuke Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/443,758

(22) PCT Filed: Sep. 25, 2013

(86) PCT No.: PCT/JP2013/005653
§ 371 (c)(1),
(2) Date: May 19, 2015

(87) PCT Pub. No.: WO2014/083734
PCT Pub. Date: Jun. 5, 2014

(65) Prior Publication Data
US 2015/0296345 A1 Oct. 15, 2015

(30) Foreign Application Priority Data

Nov. 29, 2012 (JP) ................................. 2012-260720

(51) Int. Cl.
*H04W 4/02* (2009.01)
*H04W 60/00* (2009.01)
(Continued)

(52) U.S. Cl.
CPC ............. *H04W 4/027* (2013.01); *H04M 3/42* (2013.01); *H04W 4/021* (2013.01); *H04W 4/025* (2013.01);
(Continued)

(58) Field of Classification Search
CPC ............. G06F 11/2064; G06F 11/2058; G06F 17/30241; H04W 4/027; H04W 64/006;
(Continued)

(56) References Cited

U.S. PATENT DOCUMENTS

2009/0124255 A1  5/2009 Okubo et al.
2010/0062792 A1  3/2010 Han et al.
(Continued)

FOREIGN PATENT DOCUMENTS

CN     101536366 A    9/2009
CN     101720440 A    6/2010
(Continued)

OTHER PUBLICATIONS

Akio Yasuda, "Prospect of GPS technique", The Transactions of the Institute of Electronics, Information and Communication Engineers B, Communications, J84-B (12), 2082-2091, (Dec. 1, 2001), The Institute of Electronics, Information and Communication Engineers (10 pages).
(Continued)

*Primary Examiner* — Phuoc H Doan
(74) *Attorney, Agent, or Firm* — Wilmer Cutler Pickering Hale and Dorr LLP

(57) ABSTRACT

A location information management system includes: a mobile station (30) that is located in a mobile communication network; and a service management server (40) that receives a movement sensing request to sense a movement of the mobile station (30) from a service providing server (50), the service management server (40) thereafter notify-
(Continued)

ing the service providing server (50) that the movement of the mobile station (30) has been sensed upon an occurrence of the movement of the mobile station (30). The mobile station (30) receives first area information included in information that is periodically transmitted to each mobile station located in the area, the mobile station (30) thereafter sensing that the mobile station itself has moved upon receipt of second area information, and the mobile station notifying the service management server (40) that the movement of the mobile station itself has been sensed.

16 Claims, 7 Drawing Sheets

(51) Int. Cl.
  *H04M 3/42* (2006.01)
  *H04W 64/00* (2009.01)
(52) U.S. Cl.
  CPC .......... *H04W 4/028* (2013.01); *H04W 60/00* (2013.01); *H04W 64/00* (2013.01); *H04W 64/003* (2013.01); *H04W 64/006* (2013.01)
(58) Field of Classification Search
  CPC .... H04W 24/04; H04L 67/2842; H04L 67/10; H04L 41/065; H04M 3/565; G01C 21/26
  USPC ..... 370/349, 338, 328; 455/456.1, 574, 466, 455/452, 450
  See application file for complete search history.

(56) References Cited

U.S. PATENT DOCUMENTS

| | | | |
|---|---|---|---|
| 2010/0117898 A1 | 5/2010 | Wigren | |
| 2010/0227627 A1 | 9/2010 | Ishii et al. | |
| 2011/0230189 A1 | 9/2011 | Okubo et al. | |
| 2012/0119948 A1 | 5/2012 | Tsuda | |
| 2012/0163215 A1* | 6/2012 | Kim | H04W 8/26 370/252 |
| 2013/0066960 A1* | 3/2013 | Fieremans | H04W 4/001 709/203 |

FOREIGN PATENT DOCUMENTS

| | | |
|---|---|---|
| CN | 101796857 A | 8/2010 |
| CN | 102572684 A | 7/2012 |
| EP | 1865732 A1 | 12/2007 |
| JP | 2010-263262 A | 11/2010 |
| JP | 2011-091720 A | 5/2011 |
| JP | 2011-188064 A | 9/2011 |
| JP | 2012-005048 A | 1/2012 |
| JP | 2012-181087 A | 9/2012 |
| WO | WO-2012/118610 A1 | 9/2012 |

OTHER PUBLICATIONS

RADDCOMM Wireless Consulting Services, "Location Methods for E-911 Phase II" Apr. 21, 2015 (one page).
International Search Report corresponding to PCT/JP2013/005653 mailed Dec. 24, 2013 (2 pages).
3GPP, "Technical Specification Group Services and System Aspects: Functional stage 2 description of Location Services," TS 23.271, V11.0.0, Release 11, 170 pages (Sep. 2012).
Extended European Search Report issued by the European Patent Office for Application No. 13858922.1 dated Jun. 29, 2016 (10 pages).
Chinese Office Action issued in corresponding Chinese Application No. 201380062521.3, dated Oct. 21, 2016, 12 pages.

\* cited by examiner ns, J84-B (12), 2082-2091, (Dec. 1, 2001), The
Institute of Electronics, Information and Communication
Engineers Non Patent Literature 2: RADDCOMM Wireless Consulting Services, "Location Methods for E-911 Phase II"

LOCATION INFORMATION MANAGEMENT SYSTEM, MOBILE STATION, SERVICE MANAGEMENT SERVER, MOVEMENT SENSING METHOD, AND NON-TRANSITORY COMPUTER READABLE MEDIUM

CROSS-REFERENCE TO RELATED APPLICATIONS

This application is a national stage application of International Application No. PCT/JP2013/005653 entitled "Location Information Management System, Mobile Station, Service Management Server, Movement Sensing Method, and Non-Transitory Computer Readable Medium," filed on Sep. 25, 2013, which claims the benefit of the priority of Japanese Patent Application No. 2012-260720, filed on Nov. 29, 2012, the disclosures of each of which are hereby incorporated by reference in their entirety.

TECHNICAL FIELD

The present invention relates to a location information management system, a mobile station, a service management server, a movement sensing method, and a program.

BACKGROUND ART

In recent years, there has been a rapid proliferation of mobile phones. In some cases, a single person owns a plurality of mobile phones. Further, mobile phones are not only carried by persons. It has also been considered to attach a chip having a communication function to a pet, or to install a communication function in a machine apparatus or the like, to carry out communication with the pet or the machine apparatus. In this manner, when it becomes possible to manage anything including persons, pets, apparatuses and the like via a mobile communication network, for example, it also becomes also possible to monitor the location of persons, pets, apparatuses and the like.

Here, various methods for monitoring the location of mobile phones and the like have been considered. For example, a GPS apparatus is installed in a mobile phone or the like to manage the location of the mobile phone or the like by using GPS information. For example, Non Patent Literature 1 discloses a positioning system by which latitude, longitude, and altitude information is obtained by performing triangulation on the ground using radio waves from a satellite. Further, a mobile phone or the like is connected to a nearby base station when using a mobile communication network. Base stations are generally arranged at intervals of from several hundred meters to several kilometers. Accordingly, by specifying a base station with which a mobile phone communicates, i.e., a base station to which a mobile phone is connected, the rough location of the mobile phone can be specified. For example, Non Patent Literature 2 discloses measuring the direction of a mobile phone at a plurality of base stations, and deriving the location of the mobile phone from the measured directions.

CITATION LIST

Non Patent Literature

Non Patent Literature 1: Akio Yasuda, "Prospect of GPS technique", The Transactions of the Institute of Electron-

SUMMARY OF INVENTION

Technical Problem

However, management of location information of a mobile phone or the like using a GPS apparatus involves a problem, i.e., an increase in cost of the mobile phone or the like incurred by installation of the GPS function. Another problem is difficulty in installing the GPS function in an embedded communication module because of an increase in the circuit scale and the like.

Further, in order to manage the location of a mobile phone by specifying a base station to which the mobile phone is connected, the mobile phone must be constantly connected to any base station. That is, when a mobile phone is not connected to a base station, a base station that manages the cell where the mobile phone is located cannot be specified. Thus, there is a problem that the location of the mobile phone cannot be estimated. In general, a mobile phone is connected to a base station when performing communication via a mobile communication network. That is, in the case where a mobile phone is in a standby state or the like and not performing communication, the mobile phone is not connected to any base station.

The present invention has been made to solve at least one of the above problems, and an object thereof is to provide a location information management system, a mobile station, a service management server, a movement sensing method, and a program by which the location of a mobile phone terminal can be managed without using a GPS apparatus and in a state where the mobile phone terminal is not connected to any base station.

Solution to Problem

A location information management system in accordance with a first aspect of the present invention includes: a mobile station that is located in a mobile communication network; and a service management server that receives a movement sensing request to sense a movement of the mobile station from a service providing server provided in an external communication network, the service management server thereafter notifying the service providing server that the movement of the mobile station has been sensed upon an occurrence of the movement of the mobile station, wherein the mobile station receives, from a base station forming an area in which the mobile station is located, first area information included in information that is periodically transmitted to each mobile station located in the area, the mobile station thereafter sensing that the mobile station itself has moved upon receipt of second area information different from the first area information, and the mobile station notifying the service management server that the movement of the mobile station itself has been sensed.

A mobile station in accordance with a second aspect of the present invention includes: area information monitoring means for receiving, from a base station forming a communication area, first area information included in information that is periodically transmitted to each mobile station located in the communication area, the area information monitoring means thereafter sensing that the mobile station has moved upon receipt of second area information different from the first area information; and communication means for transmitting a notification that the movement of the mobile station has been sensed to a service management server that communicates with a service providing server arranged in an external communication network.

A service management server in accordance with a third aspect of the present invention includes: first communication means for receiving, from a base station forming an area in which a mobile station is located, first area information included in information that is periodically transmitted to each mobile station located in the area, the first communication means thereafter receiving a movement sensed notification from the mobile station that senses that the mobile station itself has moved upon receipt of second area information different from the first area information; and second communication means for transmitting the movement sensed notification to a service providing server arranged in an external communication network.

A movement sensing method in accordance with a fourth aspect of the present invention includes: receiving, from a base station forming a communication area, first area information included in information periodically transmitted to each mobile station located in the communication area, and thereafter sensing that a mobile station has moved upon receipt of second area information different from the first area information; and notifying a service management server that communicates with a service providing server arranged in an external communication network that the movement of the mobile station has been sensed.

A program in accordance with a fifth aspect of the present invention includes: receiving a movement sensed notification from a mobile station that receives, from a base station forming an area in which the mobile station is located, first area information included in information periodically transmitted to each mobile station located in the area, the mobile station thereafter sensing that the mobile station itself has moved upon receipt of second area information from the base station different from the first area information; and transmitting the movement sensed notification to a service providing server arranged in an external communication network.

Advantageous Effects of Invention

The present invention can provide a location information management system, a mobile station, a service management server, a movement sensing method, and a program by which the location of a mobile phone terminal can be managed without using a GPS apparatus and in a state where the mobile phone terminal is not connected to any base station.

DESCRIPTION OF EMBODIMENTS

First Embodiment

Figure 1:
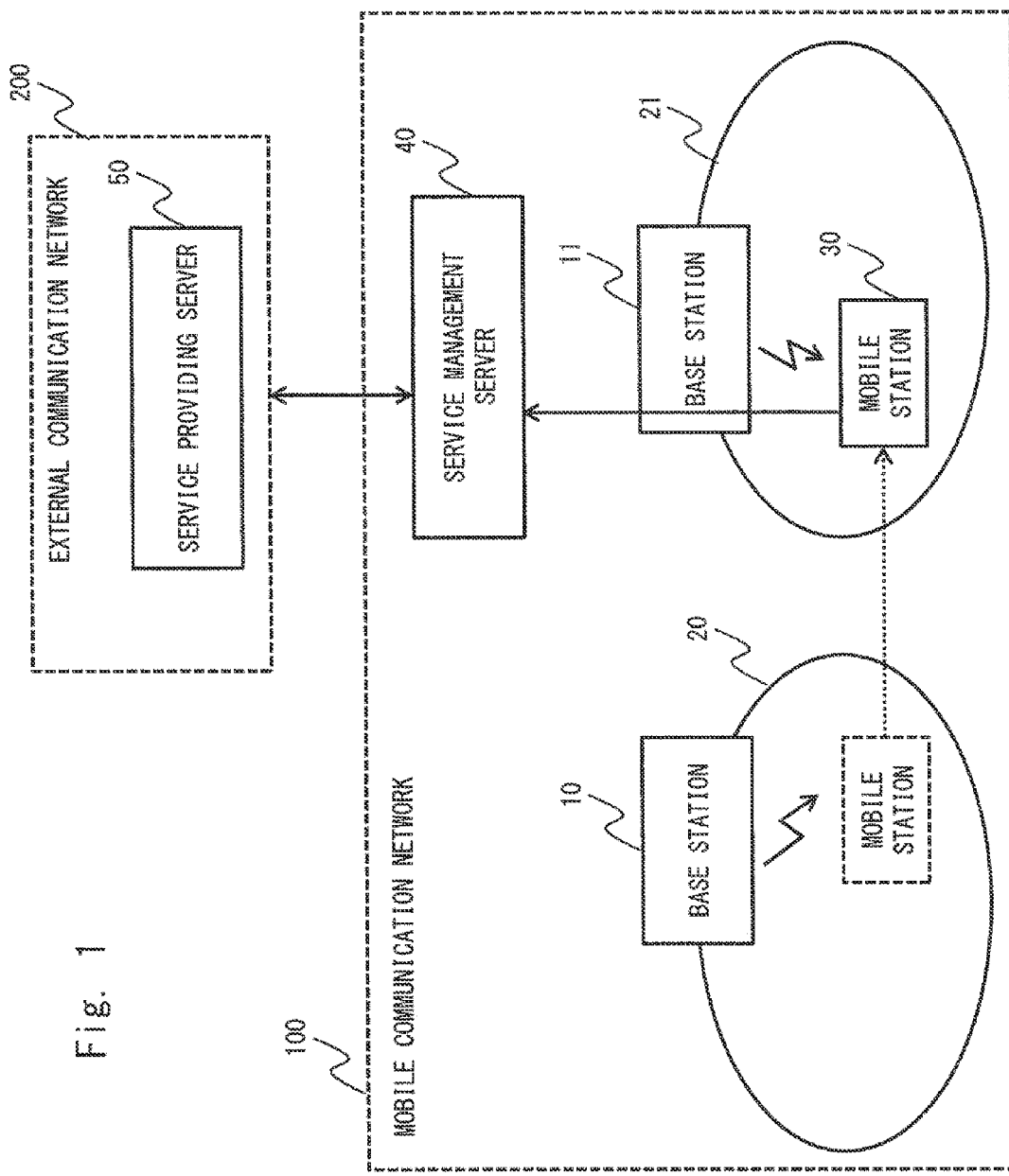
FIG. 1 is a configuration diagram of a location information management system according to a first embodiment.

In the following, a description will be given of embodiments of the present invention with reference to the drawings. With reference to FIG. 1, a description will be given of an exemplary configuration of a location information management system according to a first embodiment of the present invention. The location information management system includes apparatuses arranged in a mobile communication network 100 and an apparatus arranged in an external communication network 200. The mobile communication network 100 includes a base station 10, a base station 11, and a service management server 40. Further, a mobile station 30 is located in the mobile communication network 100. The external communication network 200 includes a service providing server 50.

The external communication network 200 is a network different from the mobile communication network 100. For example, the external communication network 200 may be a fixed communication network or a network managed by an internet provider.

The service providing server 50 is a server apparatus that provides a service using information or the like retained by each of the apparatuses in the mobile communication network 100, or using analytical information or the like obtained by analyzing a plurality of information pieces. For example, the service management server 40 provides a service of sensing the movement of the mobile station 30 located in the mobile communication network 100, and providing analytical information based on the movement sensing result of the mobile station 30. In the present drawing, though the service providing server 50 is shown as a single server apparatus, a service providing server group may be formed using a plurality of server apparatuses.

The mobile station 30 is a communication apparatus that can establish communication via radio. For example, the mobile station 30 may be a mobile phone terminal, a smartphone terminal, a tablet terminal, a personal computer or the like. Alternatively, the mobile station 30 may be a vehicle, a vending machine, an item collected by a forwarding agent or the like, in each of which a communication module is installed. Alternatively, the mobile station 30 may be an animal to which a communication module is attached. That is, the type of the mobile station 30 is not limited so long as a communication module that allows the mobile station 30 to communicate with the base station 10 or the base station 11 is installed in or attached to the mobile station 30.

The service management server 40 receives, from the service providing server 50, a movement sensing request to sense the movement of the mobile station 30. Further, when it is sensed that the mobile station 30 has moved from its current location, the service management server 40 transmits the sense result to the service providing server 50.

Next, a description will be given of a method for sensing the movement of the mobile station 30.

When the mobile station 30 is located in a cell 20 formed by the base station 10, the mobile station 30 receives information that is periodically transmitted from the base station 10. The information periodically transmitted from the base station 10 includes area information that is associated with the base station 10. For example, the area information may be a cell ID that identifies the cell 20 formed by the base station 10. Alternatively, the area information may be a TA ID that identifies a tracking area (TA), which is an area to which a paging signal is transmitted for paging the mobile station 30 when there is an incoming call for the mobile station 30.

Here, when the mobile station 30 has moved into a cell 21 formed by the base station 11, the mobile station 30 receives information that is periodically transmitted from the base station 11. Similar to the base station 10, the base station 11 periodically transmits information including the area information. Here, when the area information is the cell ID, the mobile station 30 receives a cell ID representing the cell 21 from the base station 11, because the mobile station 30 has moved into the cell 21. From then on, the mobile station 30 receives the area information that is different from the one before the movement of the mobile station 30 into the cell 21. In this manner, when the mobile station 30 receives the area information different from the previous area information, the mobile station 30 senses that the mobile station 30 itself has moved. Further, when the area information is the TA ID and the base station 10 and the base station 11 belong to different TAs, the mobile station 30 receives different pieces of area information from the base station 10 and the base station 11, respectively. When the mobile station 30 senses that the mobile station 30 itself has moved, it notifies the service management server 40 that the movement has been sensed.

The information periodically transmitted from the base station 10 is information that is transmitted to every mobile station located in the cell 20, and the destination is not particularly specified. Further, since the information periodically transmitted from the base station 10 is information that is unilaterally distributed from the base station 10 to every mobile station in the cell 20, the mobile station 30 can receive the information even in a state where the mobile station 30 is not connected to the base station 10. A state where the mobile station 30 is connected to the base station 10 is the state where a communication resource for the mobile station 30 is allocated in the base station 10 for the base station 10 to transmit data destined to the mobile station 30. That is, the mobile station 30 can receive the area information that is unilaterally distributed from the base station 10, even in the state where the mobile station 30 is not connected to the base station 10.

Similarly, the base station 11 unilaterally distributes information including the area information to every mobile station located in the cell 21. Thus, the mobile station 30 can recognize in which area the mobile station 30 is located by checking the area information transmitted from the base station 10 and the base station 11. Accordingly, the mobile station 30 can also sense that the mobile station 30 has moved into a different area.

For example, the service providing server 50 can provide the following service by using the movement information of the mobile station 30.

In the case where the mobile station 30 is an item or the like to be collected by a forwarding agent, the forwarding agent manages the item by keeping the item at one place for a prescribed time until the item is delivered next morning. Further, the forwarding agent manages the item by attaching a communication module to the item. In such a case, when the item—the mobile station 30—has moved to another location within a prescribed time, the service providing server 50 can estimate that the item has been stolen. Accordingly, when the service providing server 50 senses that the item has moved to the other location, the service providing server 50 can notify the forwarding agent that the item might have been stolen. Such service is merely one example, and the movement information of the mobile station 30 may be applied to another service.

As described above, the mobile station 30 in FIG. 1 can sense the movement of itself without using a GPS apparatus. Accordingly, as compared to an apparatus in which a GPS function is installed, the costs of the mobile station 30 can be reduced and, additionally, a reduction in size of the apparatus can be achieved.

Further, by monitoring the area information transmitted from base stations, the mobile station 30 can sense the movement of itself even in the state where it is not connected to any base station, e.g., the state where it is awaiting communication. Accordingly, battery consumption can be suppressed as compared to that of a terminal apparatus that must be constantly connected to the base station for managing the location information, because the number of times of establishing communication with any base station can be reduced.

Figure 2:
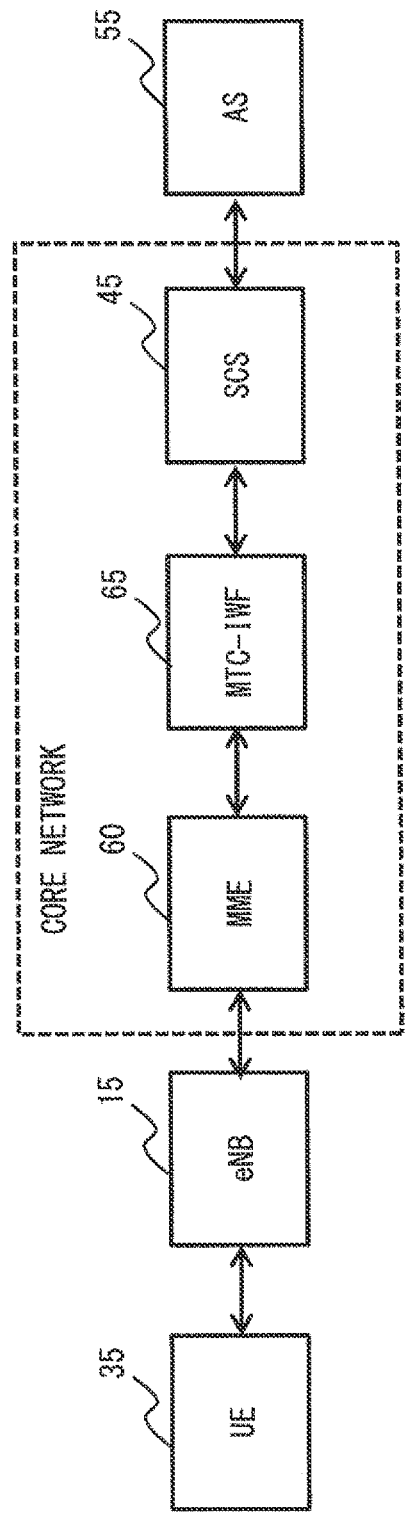
FIG. 2 is a configuration diagram of a 3GPP network according to the first embodiment.

Next, with reference to FIG. 2, a description will be given of a network configuration for realizing the location information management system of the present invention. The network shown in FIG. 2 includes a UE (User Equipment) 35, an eNB (evolved NodeB) 15, an MME 60, an MTC-IWF 65, an SCS 45, and an AS (Application Server) 55. The eNB 15, the MME 60, the MTC-IWF 65, and the SCS 45 are apparatuses that structure the network defined in the 3GPP. The technical specification of the 3GPP defines the functions of the eNB 15, the MME 60, the MTC-IWF 65, and the SCS 45. The MME 60, the MTC-IWF 65, and the SCS 45 structure the core network. Further, the UE 35 is the apparatus name used for representing the mobile station 30 in the 3GPP. The AS 55 is an application server that is managed by a business entity different from the mobile network operator, and corresponds to the service providing server 50.

The eNB 15 is a base station that operates according to a radio scheme using the LTE (Long Term Evolution). The SCS 45 communicates with the AS 55. The SCS 45 corresponds to the service management server 40. The MME 60 chiefly performs movement management of the UE 35. The MTC-IWF 65 is used for relaying communication between the eNB 15 as well as the apparatuses structuring the core network, and the SCS 45.

Figure 3:
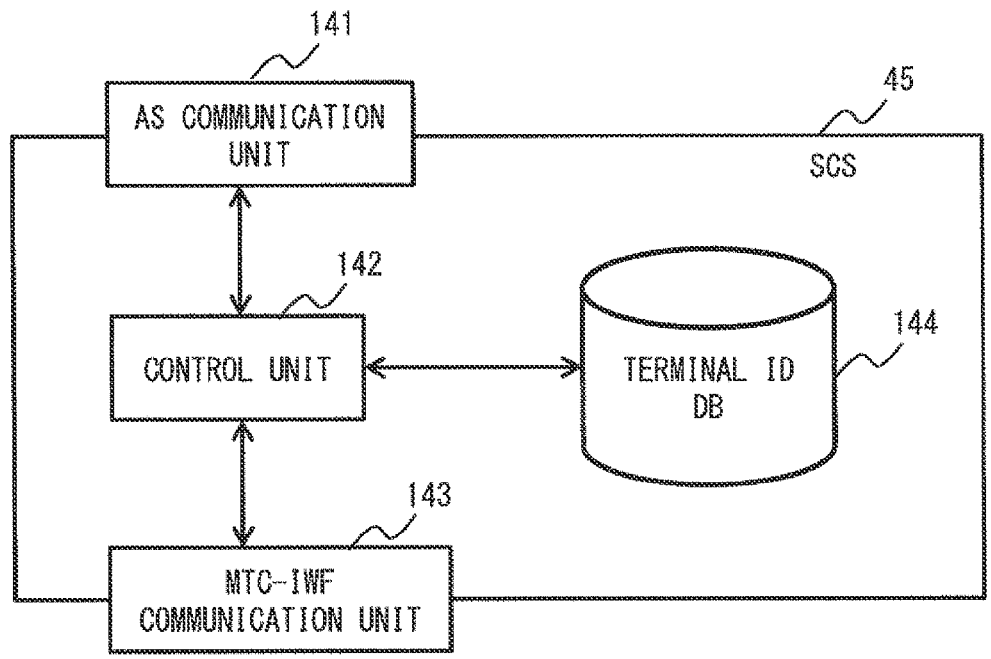
FIG. 3 is a configuration diagram of an SCS according to the first embodiment.

Next, with reference to FIG. 3, a description will be given of an exemplary configuration of the SCS 45 according to the first embodiment of the present invention. The SCS 45 includes an AS communication unit 141, a control unit 142, an MTC-IWF communication unit 143, and a terminal ID database (terminal ID DB) 144.

The AS communication unit 141 communicates with the AS 55. The AS communication unit 141 receives a message relating to a movement sensing request from the AS 55. In the movement sensing request, the UE 35 whose movement sensing is desired is specified. When the AS communication unit 141 senses the movement of the UE 35 specified in the movement sensing request, the AS communication unit 141 notifies the AS 55 of the sense result.

The terminal ID DB 144 manages the UE 35 specified by the AS 55 and the identifier of the UE 35 used in the mobile communication network 100 in association with each other.

For example, the AS 55 may specify the UE 35 using the telephone number, and the apparatuses in the mobile communication network 100 may identify the UE 35 using the machine number. Alternatively, the apparatuses in the mobile communication network 100 may use IMSI (International Mobile Subscriber Identity) or the like in place of the machine number, and identify the UE 35 using an identifier uniquely determined in the mobile communication network 100. In the foregoing example, the terminal ID DB 144 carries out management by associating a plurality of telephone numbers and machine numbers or IMSIs or the like with each other.

The control unit 142 receives a movement sensing request via the AS communication unit 141. The control unit 142 specifies the identifier of the UE 35, which is used in the mobile communication network 100, specified in the movement sensing request. The control unit 142 extracts, from the terminal ID DB 144, the identifier of the UE 35 which is used in the mobile communication network 100 and which is managed so as to be associated with the identifier of the UE 35 included in the movement sensing request. The control unit 142 transmits, to the MTC-IWF 65 via the MTC-IWF communication unit 143, the identifier of the UE 35 used in the mobile communication network 100.

The MTC-IWF communication unit 143 communicates with the MTC-IWF 65. The MTC-IWF communication unit 143 transmits the identifier of the UE 35 extracted by the control unit 142 to the MTC-IWF 65. Further, the MTC-IWF communication unit 143 receives a movement sensed notification of the UE 35 transmitted from the MTC-IWF 65, and outputs the movement sensed notification to the control unit 142. The control unit 142 transmits the movement sensed notification to the AS 55 via the AS communication unit 141.

Figure 4:
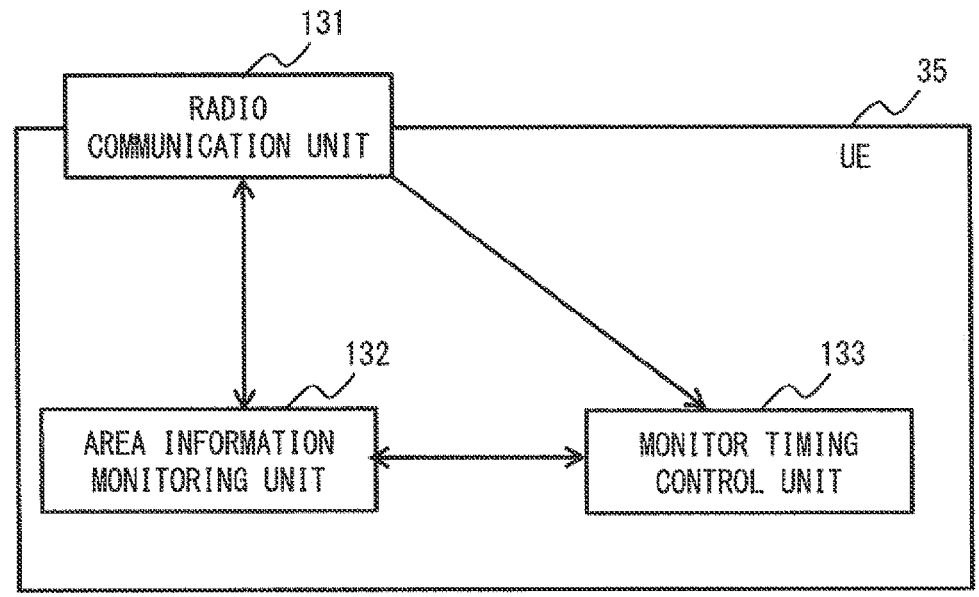
FIG. 4 is a configuration diagram of a UE according to the first embodiment.

Next, with reference to FIG. 4, a description will be given of an exemplary configuration of the UE 35 according to the first embodiment of the present invention. The UE 35 includes a radio communication unit 131, an area information monitoring unit 132, and a monitor timing control unit 133. The radio communication unit 131 communicates with the eNB 15 via a radio line. The radio communication unit 131 receives, for example, system information as the information periodically transmitted from the eNB 15. The system information is information that is transmitted from the eNB 15 to every UE 35 located in a cell formed by the eNB 15. Further, the system information includes information that is required for a communication terminal such as the UE 35 to initiate communication.

The system information includes a plurality of SIBs (System Information Blocks). Further, in an SIB 1 out of the plurality of SIBs, the Cell ID (cell ID) and the TA ID of the eNB 15 are set as the area information. The Cell ID is an ID that differs among the cells formed by eNBs. Accordingly, the Cell IDs transmitted from different eNBs are each unique. The TA ID is an ID that represents the location registration area of the UE 35. In general, a TA is formed by a plurality of cells. Accordingly, different eNBs may transmit an identical TA ID. The UE 35 executes a location registration process when the UE 35 has moved to a different TA. Further, when there is an incoming call to a UE 35, UEs are paged on a TA ID-by-TA ID basis. That is, the MME 60 transmits a paging signal to every UE located in an identical TA via a plurality of eNBs.

Further, the radio communication unit 131 receives a movement sensing request transmitted from the SCS 45 via the eNB 15.

The area information monitoring unit 132 monitors the area information set in the SIB 1. After receiving the movement sensing request, the area information monitoring unit 132 monitors the area information. Here, when the area information monitoring unit 132 is continuously receiving identical area information, the area information monitoring unit 132 determines that the UE 35 has not moved. When the previously received area information and the newly received area information are different from each other, the area information monitoring unit 132 senses that the UE 35 has moved. That is, the area information monitoring unit 132 senses that the UE 35 has moved when there is a change in the received Cell ID or TA ID. When there is a change in the received area information, the area information monitoring unit 132 transmits a message representing a movement sensed notification to the eNB via the radio communication unit 131. The movement sensed notification is transmitted to the SCS 45, and is further transmitted from the SCS 45 to the AS 55.

The monitor timing control unit 133 controls the timing at which the area information monitoring unit 132 monitors the area information. That is, the monitor timing control unit 133 controls the intervals between the times that the area information monitoring unit 132 monitors the area information.

Further, the UE 35 enters an activated state only at the timing of receiving the system information, and remains in a deactivated state at another timing. The activated state is, for example, the state where the function units structuring the UE 35 are activated. That is, the monitor timing control unit 133 may control the timing at which the radio communication unit 131 receives the system information by controlling the timing of activating the radio communication unit 131 and the area information monitoring unit 132, and receive the area information at a prescribed timing.

The timing of monitoring the area information may be included in the movement sensing request transmitted from the SCS 45. In this case, the monitor timing control unit 133 may receive the movement sensing request via the radio communication unit 131, and extract information relating to timing of monitoring the area information. The monitor timing control unit 133 may activate the area information monitoring unit 132 only at the timing of monitoring the area information, and may stop the area information monitoring unit 132 at another timing.

Figure 5:
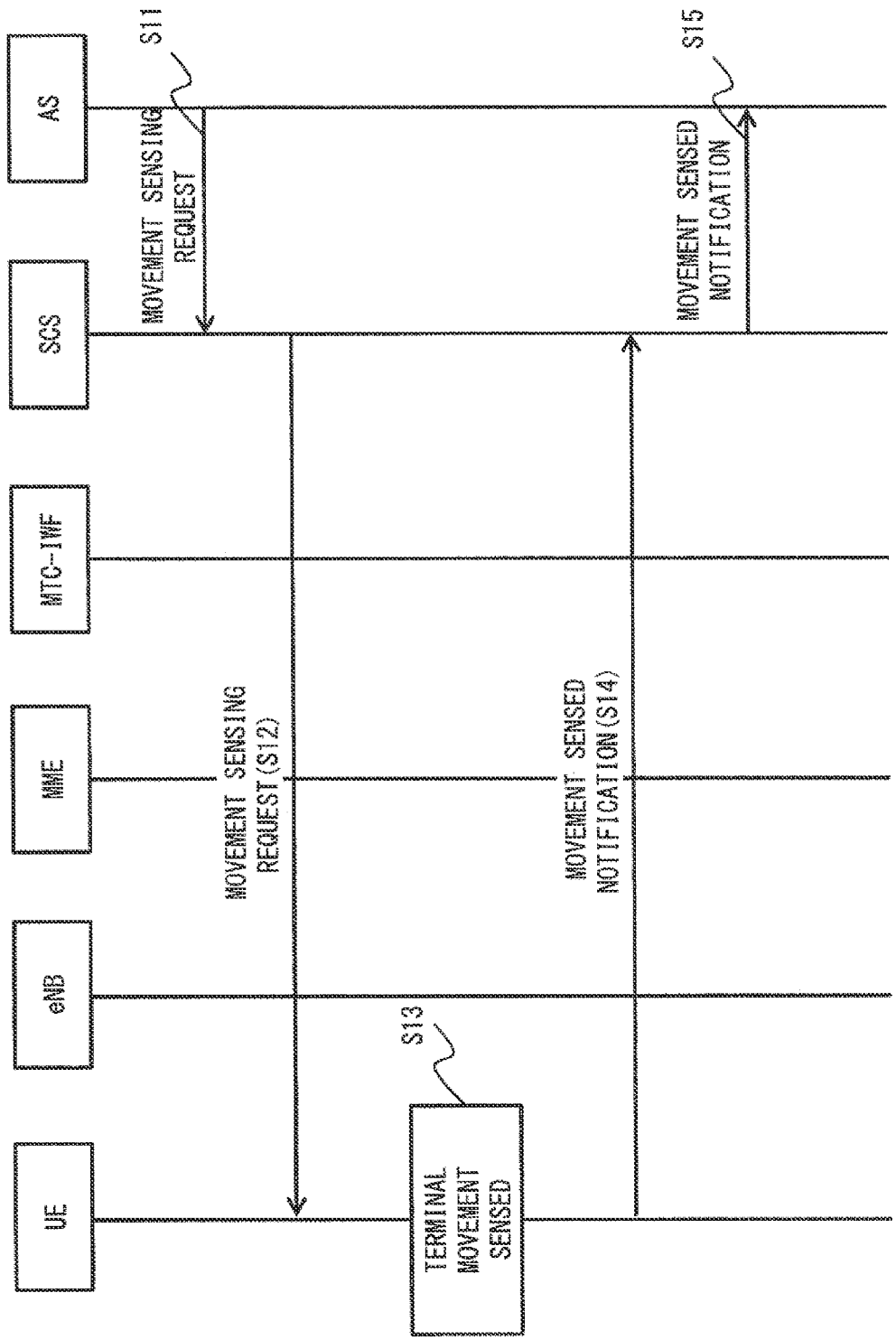
FIG. 5 is a diagram showing the flow of a movement sensing process according to the first embodiment.

Next, with reference to FIG. 5, a description will be given of a movement sensing process according to the first embodiment of the present invention. Firstly, the AS 55 transmits a movement sensing request to the SCS 45 (S11). The movement sensing request transmitted from the AS 55 to the SCS 45 includes information relating to the UE whose movement sensing is desired, and a sense policy. The sense policy is, for example, information representing the intervals between the times of monitoring the UE, or a time or a period for monitoring the UE.

Next, the SCS 45 transmits a movement sensing request to the UE 35 (S12). For example, the SCS 45 transmits the movement sensing request as application data such as OMA-DM. In the case where application data such as OMA-DM is used in transmitting the movement sensing request, the movement sensing request is not terminated at a relay apparatus between the SCS 45 and the UE 35. That is, in the case where application data such as OMA-DM is used in transmitting the movement sensing request, the AS 55 transmits the movement sensing request to the UE 35 so that it passes through the relay apparatus between the SCS 45 and the UE 35. The movement sensing request includes the sense policy.

Next, when the UE 35 receives the movement sensing request from the SCS 45, the UE 35 executes the movement sensing process (S13). The flow of the movement sensing process will be detailed later. In the case where the UE 35 senses movement within the monitoring time specified by the SCS 45, the UE 35 transmits a movement sensed notification to the SCS 45 (S14). For example, the UE 35 transmits the movement sensed notification as application data such as OMA-DM, similarly to transmit the movement sensing request. The movement sensed notification includes information relating to the current location after the movement.

Next, the SCS 45 transmits a movement sensed notification to the AS 55 (S15). The movement sensed notification transmitted from the SCS 45 to the AS 55 includes information of the UE whose movement has been sensed and information relating to the current location of the UE. In this manner, the AS 55 can sense whether or not the UE specified in the movement sensing request has moved within a prescribed time.

Figure 6:
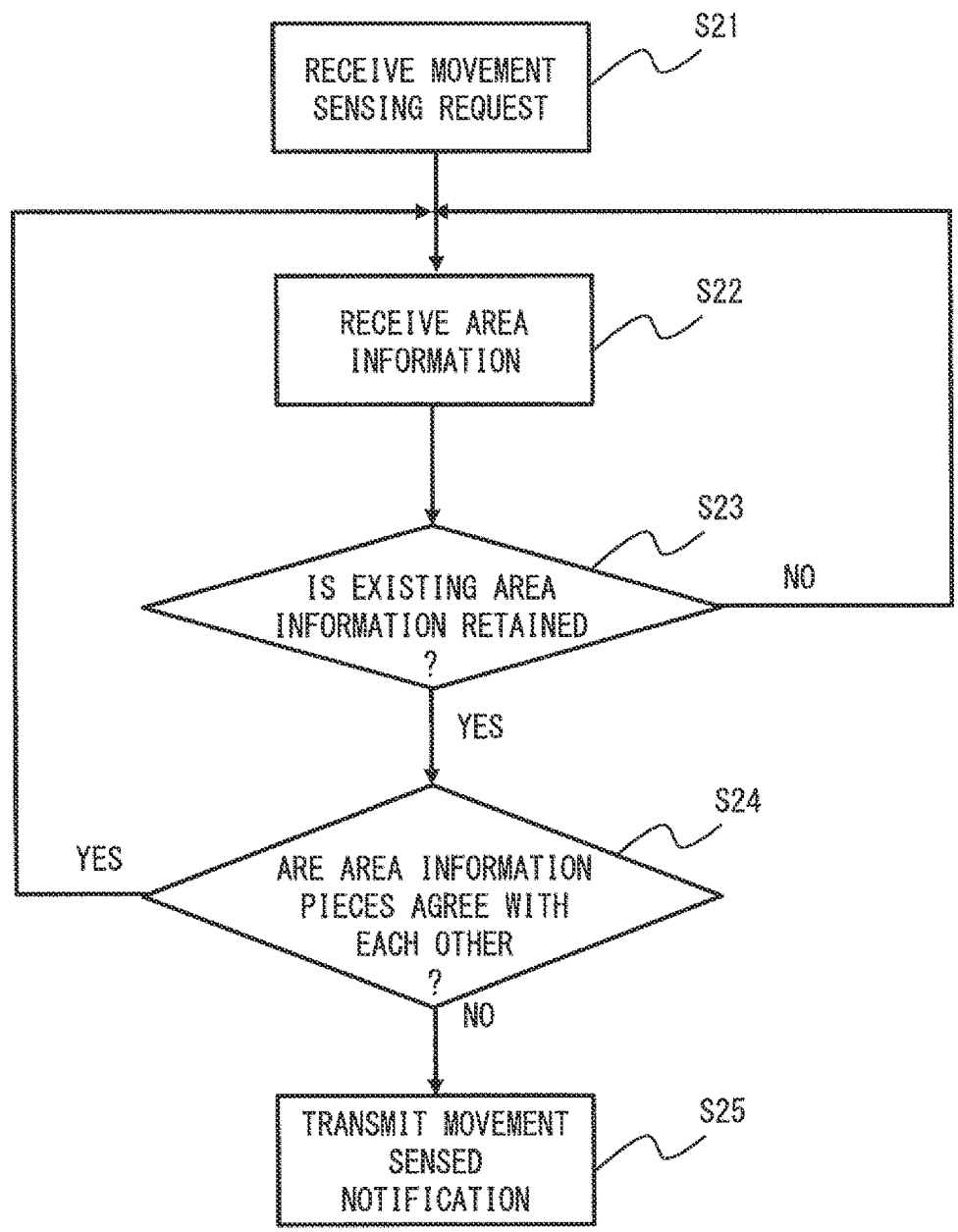
FIG. 6 is a diagram showing the flow of a movement sensing process in the UE according to the first embodiment.

Subsequently, with reference to FIG. 6, a description will be given of the flow of the movement sensing process in the UE 35 according to the first embodiment of the present invention. Firstly, the area information monitoring unit 132 receives a movement sensing request from the SCS 45 (S21). Next, the area information monitoring unit 132 receives area information included in system information from a nearby eNB (S22). When the monitor timing is specified in the movement sensing request, the area information monitoring unit 132 may receive the area information at the specified monitor timing. Here, the area information monitoring unit 132 determines whether or not previously received area information is retained (S23). When the area information monitoring unit 132 determines that the previously received area information is not retained, the area information monitoring unit 132 repeats the process of Step S22. When the area information monitoring unit 132 determines that the previously received area information is retained, the area information monitoring unit 132 determines whether or not the currently received area information and the previously received area information agree with each other (S24).

When the area information monitoring unit 132 determines that the currently received area information and the previously received area information agree with each other, the area information monitoring unit 132 determines that the UE 35 has not moved, and repeats the process of Step S22. When the area information monitoring unit 132 determines that the currently received area information and the previously received area information do not agree with each other, the area information monitoring unit 132 determines that the UE 35 has moved, and transmits a movement sensed notification to the SCS 45 (S25).

Here, in the case where the monitoring time of the UE is set in the movement sensing request received in Step S21, the following process may be executed. In Step S24, when the area information monitoring unit 132 determines that the currently received area information and the previously received area information agree with each other, the area information monitoring unit 132 may further determine whether or not the monitoring time set in the movement sensing request has elapsed. When the area information monitoring unit 132 determines that the monitoring time set in the movement sensing request has elapsed, the area information monitoring unit 132 may end the process without repeating the process of Step S22. When the area information monitoring unit 132 determines that the monitoring time set in the movement sensing request has not elapsed, the area information monitoring unit 132 may repeat the process of Step S22.

Further, when the monitoring time of the UE is not set in the movement sensing request, the SCS 45 may transmit, to the UE 35, a message representing that the movement sensing is stopped at the timing at which the movement sensing is to be stopped. When the UE 35 has received a message representing the movement sensing stop, the UE 35 stops execution of the movement sensing process shown in FIG. 6.

As described above, use of the location information management system according to the first embodiment of the present invention allows the UE to sense the movement of itself without using the GPS and, moreover, without constantly connecting to any eNB. Further, by setting a sense policy from the SCS 45 to the UE 35, the time for continuing the movement sensing of the UE, or the intervals between the times that the UE executes the movement sensing process can be changed.

For example, when a long interval between the times that the UE executes the movement sensing process is set, it becomes possible to reduce the number of times that the UE executes the process of determining whether or not the area information included in the system information agrees with the previously received area information. Thus, the power consumption of the UE can be reduced.

Second Embodiment

Figure 7:
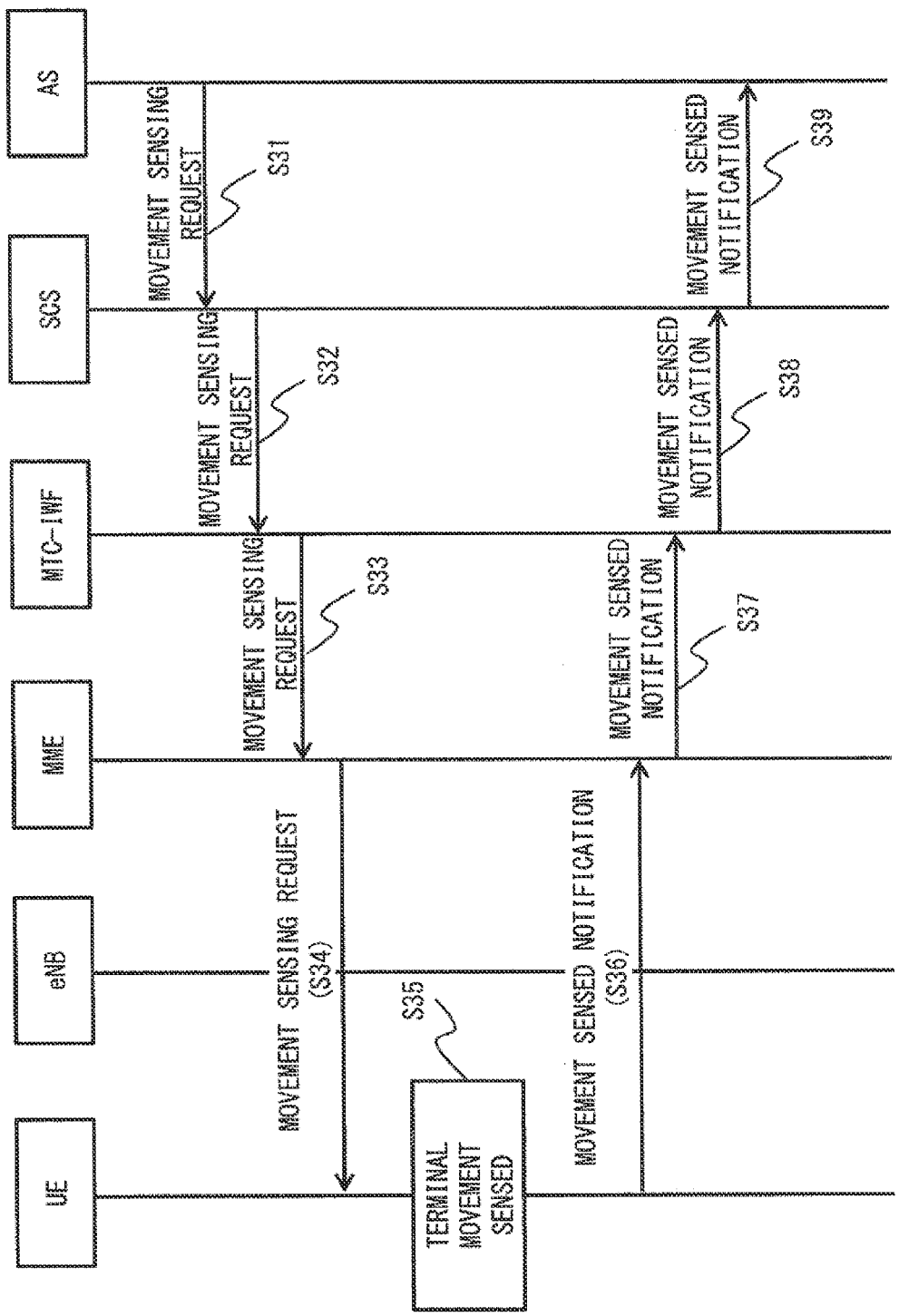
FIG. 7 is a diagram showing the flow of a movement sensing process according to a second embodiment.

Subsequently, with reference to FIG. 7, a description will be given of the flow of a movement sensing process according to a second embodiment of the present invention. Firstly, the AS 55 transmits a movement sensing request to the SCS 45 (S31). The movement sensing request transmitted from the AS 55 to the SCS 45 includes information relating to the UE whose movement sensing is desired, and a sense policy. The sense policy is, for example, information representing the intervals between the times of monitoring the UE, or the time of monitoring the UE.

Next, the SCS 45 transmits a movement sensing request to the MTC-IWF 65 (S32). For example, the SCS 45 transmits the movement sensing request using the interface defined between the SCS 45 and the MTC-IWF 65. The interface between the SCS 45 and the MTC-IWF 65 may be, for example, Tsp interface defined in the 3GPP. The SCS 45 transmits the movement sensing request as control data. In the following description also, the MTC-IWF 65, the MME 60 and the like use each movement sensing request as control data. The movement sensing request transmitted from the SCS 45 to the MTC-IWF 65 includes an identifier of the UE and the sense policy. The identifier of the UE is an identifier associated with the UE specified by the AS 55 and used in the mobile communication network 100.

Next, the MTC-IWF 65 specifies the MME 60 to be the recipient of a movement sensing request, and transmits the movement sensing request to the specified MME 60 (S33). The MTC-IWF 65 specifies, as the MME 60 to be the recipient, the MME 60 that manages the UE specified in the movement sensing request transmitted from the SCS 45. The MTC-IWF 65 transmits the movement sensing request using an interface specified between the MTC-IWF 65 and the MME 60. The interface between the MTC-IWF 65 and the MME 60 may be, for example, T5 interface defined in the 3GPP. The movement sensing request transmitted from the MTC-IWF 65 to the MME 60 includes an identifier of the UE used in the mobile communication network 100 and the sense policy.

Next, the MME 60 transmits a movement sensing request to the specified UE 35 (S34). The MME 60 transmits the movement sensing request using the interface defined between the MME 60 and the UE 35. For example, the MME 60 transmits the movement sensing request using the NAS (Non-Access Stratum) protocol defined in the 3GPP. The movement sensing request includes the sense policy.

Next, when the UE 35 receives the movement sensing request, the UE 35 executes the movement sensing process based on the sense policy (S35). For example, the area information monitoring unit 132 may execute the movement sensing process at each monitor timing set in the sense policy. When the UE 35 senses movement in the movement sensing process, the UE 35 transmits a movement sensed notification to the MME 60 using the NAS protocol (S36).

Next, the MME 60 transmits a movement sensed notification to the MTC-IWF 65 using a route similar to that in Step S33 (S37). Next, the MTC-IWF 65 transmits a movement sensed notification to the SCS 45 using a route similar to that in Step S32 (S38). Next, the SCS 45 transmits a movement sensed notification to the AS 55 using a route similar to that in Step S31 (S39).

As described above, by receiving a movement sensing request using the flow of the movement sensing process according to the second embodiment of the present invention, the UE can sense the movement of itself without using the GPS and, moreover, without constantly connecting to any eNB. Further, the UE can notify the AS 55 of a movement sensed notification.

Here, the second embodiment of the present invention is different from the first embodiment in regard to the protocol that is used for transmitting each movement sensing request and each movement sensed notification. That is, in the first embodiment, each movement sensing request and each movement sensed notification are transmitted as application data or user data between the AS 55 and the UE 35, whereas in the second embodiment, the SCS 45, the MTC-IWF 65, the MME 60, and the UE 35 transmit and receive each movement sensing request and each movement sensed notification via the protocol that is used for transmitting control signals among such apparatuses. In this manner, an effect similar to that of the first embodiment can be achieved.

Third Embodiment

Figure 8:
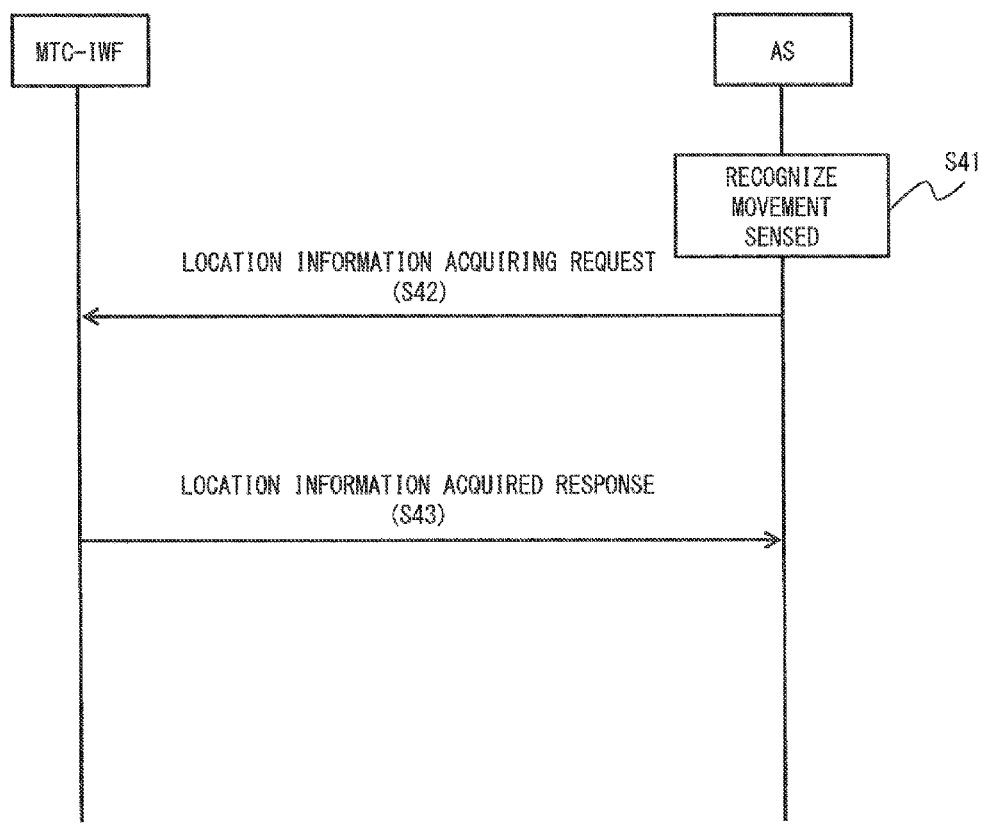
FIG. 8 is a diagram showing the flow of a location information acquiring process of a UE according to a third embodiment.

Next, with reference to FIG. 8, a description will be given of the flow of a UE location information acquiring process according to a third embodiment of the present invention.

Firstly, the SCS 45 senses or recognizes that the specified UE has moved (S41). For example, as described with reference to FIG. 5 or FIG. 7, the SCS 45 senses that the specified UE has moved by receiving a movement sensed notification from the UE 35 or the MTC-IWF 65.

Subsequently, the SCS 45 transmits a location information acquiring request to the MTC-IWF 65 (S42). The SCS 45 may transmit, to the MTC-IWF 65, the location information acquiring request in which the identification information of the UE whose movement has been sensed, intervals between the times at which location information is acquired and the like are set.

When the MTC-IWF 65 receives the location information acquiring request, the MTC-IWF 65 detects the location information of the specified UE 35. For example, the UE 35 may autonomously connect to the eNB 15 when the UE 35 senses the movement of itself in the movement sensing process described with reference to FIG. 6. Alternatively, as described with reference to FIG. 5 or FIG. 7, the MME 60 may be controlled to connect the eNB 15 and the UE 35 upon receipt of a movement sensed notification from the UE 35. In this manner, when the UE 35 is connected to the eNB 15, the MTC-IWF 65 provides the SCS 45 with a location information acquired response in which information relating to the eNB 15 to which the UE 35 is connected is set (S43). When the intervals between the times at which location information is acquired is set in the location information acquiring request, the MTC-IWF 65 may transmit the location information acquired response at each specified interval to the SCS 45. The SCS 45 can grasp the rough location of the UE 35 by recognizing the eNB 15 to which the UE 35 is connected.

Further, in the case where the location information of the UE is acquired after the movement of the UE has been sensed, a specific billing rate may be set to the AS 55 desiring to acquire the location information. The SCS 45 may notify, for example, a billing information processing server of the billing rate that is set to the AS 55 desiring to acquire the location information. In this case, the billing rate may be varied depending on the intervals between the times at which location information is acquired, the number of UEs whose location information is to be acquired and the like.

As described above, use of the flow of the UE location information acquiring process according to the third embodiment of the present invention makes it possible to track the location of the UE 35 which has started to move. Thus, for example when the UE 35 is stolen, the AS 55 can track the location of the UE 35.

Note that the present invention is not limited to the above-described embodiments, and that they can be appropriately changed without departing from the spirit of the invention.

REFERENCE SIGNS LIST

Although the present invention has been explained as a hardware configuration in the above-mentioned embodiments, it is not limited to this. The present invention can achieve processing of FIG. 6 by making a CPU (Central Processing Unit) execute a computer program.

In the above-mentioned example, the program can be stored using various types of non-transitory computer readable media, and can be supplied to a computer. The non-transitory computer readable media include various types of tangible storage media. Examples of the non-transitory computer readable medium include: a magnetic recording medium (for example, a flexible disk, a magnetic tape, a hard disk drive); a magnetic optical recording medium (for example, a magnetic optical disk); a CD-ROM (Read Only Memory); a CD-R; a CD-R/W; and a semiconductor memory (for example, a mask ROM, a PROM (Programmable ROM), an EPROM (Erasable PROM), a flash ROM, an RAM (Random Access Memory)). In addition, the program may be supplied to the computer by various types of transitory computer readable media. Examples of the transitory computer readable media include an electrical signal, an optical signal, and an electromagnetic wave. The transitory computer readable medium can supply the program to the computer through a wired communication channel, such as an electric wire and an optical fiber, or a wireless communication channel. The spirit of the invention.

Hereinbefore, although the invention in the present application has been explained with reference to the embodiments, the invention in the present application is not limited by the above. Various changes that those skilled in the art can understand within the scope of the invention can be made to a configuration and a detail of the invention in the present application.

This application claims priority based on Japanese Patent Application No. 2012-260720 filed on Nov. 29, 2012, and the entire disclosure thereof is incorporated herein.

10 base station
11 base station
15 eNB
20 cell
21 cell
30 mobile station
35 UE
40 service management server
45 SCS
50 service providing server
55 AS
60 MME
65 MTC-IWF
100 mobile communication network
131 radio communication unit
132 area information monitoring unit
133 monitor timing control unit
141 AS communication unit
142 control unit
143 MTC-IWF communication unit
144 terminal ID DB
200 external communication network

The invention claimed is:

1. A location information management system comprising:
    a mobile station that is located in a mobile communication network; and
    a service management server that receives a movement sensing request to sense a movement of the mobile station from a service providing server provided in an external communication network, the service management server thereafter notifying the service providing server that the movement of the mobile station has been sensed upon an occurrence of the movement of the mobile station, wherein
    the mobile station receives, from a base station forming an area in which the mobile station is located, first area information included in information that is periodically transmitted to each mobile station located in the area, the mobile station thereafter sensing that the mobile station itself has moved upon receipt of second area information different from the first area information, and the mobile station notifying the service management server that the movement of the mobile station itself has been sensed,
    the service management server notifies the mobile station of a monitoring time for monitoring sensing of a movement of the mobile station, and
    the mobile station notifies the service management server that the movement of the mobile station has been sensed when the mobile station senses that the mobile station has moved within the monitoring time, and the mobile station does not notify the service management server of the movement sensing result when the monitoring time has elapsed.

2. The location information management system according to claim 1, wherein the service management server notifies the mobile station of the intervals between the times of monitoring the area information included in the information periodically transmitted from the base station.

3. The location information management system according to claim 1, wherein the service management server notifies the mobile station of an end of the monitoring time when the monitoring time has elapsed.

4. The location information management system according to claim 1, wherein the mobile station itself manages whether or not the monitoring time has elapsed.

5. The location information management system according to claim 1, wherein
    the mobile station connects to a base station in an area of which the mobile station is currently located, when the mobile station senses that the mobile station itself has moved, and
    the service management server receives information relating to the base station to which the mobile station is connected.

6. The location information management system according to claim 1, further comprising a movement management apparatus that manages location information of the mobile station, the movement management apparatus connecting a base station in an area of which the mobile station is currently located and the mobile station to each other, when it is sensed that the mobile station has moved.

7. The location information management system according to claim 1, wherein the service management server transmits the movement sensing request to the mobile station using application data.

8. The location information management system according to claim 1, wherein the service management server transmits the movement sensing request to the mobile station using a control signal defined among communication nodes arranged in the mobile communication network.

9. A mobile station comprising:
    an area information monitoring unit that receives, from a base station forming a communication area, first area information included in information that is periodically transmitted to each mobile station located in the communication area, the area information monitoring unit thereafter sensing that the mobile station has moved upon receipt of second area information different from the first area information; and
    a communication unit that transmits a notification that the movement of the mobile station has been sensed to a service management server that communicates with a service providing server arranged in an external communication network, wherein
    the communication unit receives, from the service management server, information relating to a monitoring time for monitoring sensing of a movement, and
    the area information monitoring unit notifies the service management server that the movement of the mobile station has been sensed when the mobile station senses that the mobile station has moved within the monitoring time, and the area information monitoring unit does not notify the service management server of the movement sensing result when the monitoring time has elapsed.

10. A service management server comprising:
    a first communication unit that receives, from a base station forming an area in which a mobile station is located, first area information included in information that is periodically transmitted to each mobile station located in the area, the first communication unit thereafter receiving a movement sensed notification from the mobile station that senses that the mobile station itself has moved upon receipt of second area information different from the first area information; and a second communication unit that transmits the movement sensed notification to a service providing server arranged in an external communication network, wherein the first communication unit notifies the mobile station of a monitoring time for monitoring sensing of a movement of the mobile station, and receives the movement sensed notification from the mobile station that has sensed that the mobile station has moved within the monitoring time and does not receive the movement sensed notification from the mobile station when the monitoring time has elapsed.

11. The service management server according to claim 10, wherein the first communication unit notifies the mobile station of the intervals between the times of monitoring the area information included in the information periodically transmitted from the base station.

12. The service management server according to claim 10, wherein the first communication unit notifies the mobile station of an end of the monitoring time when the monitoring time has elapsed.

13. A movement sensing method comprising:

receiving, from a service management server that communicates with a service providing server arranged in an external communication network, information relating to a monitoring time for monitoring sensing of a movement;

receiving, from a base station forming a communication area, first area information included in information periodically transmitted to each mobile station located in the communication area, and thereafter sensing that a mobile station has moved upon receipt of second area information different from the first area information; and notifying the service management server that the movement of the mobile station has been sensed when the mobile station senses that the mobile station has moved within the monitoring time, and not notifying the service management server of the movement sensing result when the monitoring time has elapsed.

14. A non-transitory computer readable medium that stores a program for causing a computer to execute the steps of:

receiving, from a service management server that communicates with a service providing server arranged in an external communication network, information relating to a monitoring time for monitoring sensing of a movement;

receiving, from a base station forming a communication area, first area information included in information periodically transmitted to each mobile station located in the communication area, and thereafter sensing that a mobile station has moved upon receipt of second area information different from the first area information; and notifying the service management server that the movement of the mobile station has been sensed when the mobile station senses that the mobile station has moved within the monitoring time, and not notifying the service management server of the movement sensing result when the monitoring time has elapsed.

15. A movement sensing method comprising:

notifying a mobile station that receives, from a base station forming an area in which the mobile station is located, first area information included in information periodically transmitted to each mobile station located in the area, the mobile station thereafter sensing that the mobile station itself has moved upon receipt of second area information from the base station different from the first area information of a monitoring time for monitoring sensing of a movement of the mobile station;

receiving a movement sensed notification from the mobile station that has sensed that the mobile station has moved within the monitoring time, and not receiving the movement sensed notification from the mobile station when the monitoring time has elapsed; and transmitting the movement sensed notification to a service providing server arranged in an external communication network.

16. A non-transitory computer readable medium that stores a program for causing a computer to execute the steps of:

notifying a mobile station that receives, from a base station forming an area in which the mobile station is located, first area information included in information periodically transmitted to each mobile station located in the area, the mobile station thereafter sensing that the mobile station itself has moved upon receipt of second area information from the base station different from the first area information of a monitoring time for monitoring sensing of a movement of the mobile station;

receiving a movement sensed notification from the mobile station that has sensed that the mobile station has moved within the monitoring time, and not receiving the movement sensed notification from the mobile station when the monitoring time has elapsed; and transmitting the movement sensed notification to a service providing server arranged in an external communication network.

* * * * *